United States Patent [19]

Suzuki

[11] Patent Number: 5,796,508

[45] Date of Patent: Aug. 18, 1998

[54] MICROMIRROR TYPE IMAGE FORMING APPARATUS AND ADMINISTRATION METHOD FOR THE SAME

[75] Inventor: Kenji Suzuki, Kanagawa, Japan

[73] Assignee: Fuji Photo Film Co., Ltd., Kanagawa, Japan

[21] Appl. No.: 807,357

[22] Filed: Feb. 27, 1997

[30] Foreign Application Priority Data

Feb. 28, 1996 [JP] Japan .................................. 8-041266

[51] Int. Cl.$^6$ .............................. G02B 26/08; G02B 26/12
[52] U.S. Cl. ...................... 359/224; 359/855; 359/872; 355/37; 345/84
[58] Field of Search ...................... 355/37, 35, 41; 359/224, 855, 872; 345/84

[56] References Cited

U.S. PATENT DOCUMENTS

| | | | |
|---|---|---|---|
| 4,571,603 | 2/1986 | Hornbeck et al. | 346/160 |
| 4,888,616 | 12/1989 | Nanamura et al. | 355/202 |
| 5,041,851 | 8/1991 | Nelson | 346/160 |
| 5,387,924 | 2/1995 | Gale, Jr. et al. | 345/108 |
| 5,430,524 | 7/1995 | Nelson | 355/200 |
| 5,504,504 | 4/1996 | Markandey et al. | 345/214 |
| 5,610,624 | 3/1997 | Bhuva | 345/84 |
| 5,617,242 | 4/1997 | Weaver | 357/221 |
| 5,623,281 | 4/1997 | Markandey et al. | 345/84 |
| 5,659,374 | 8/1997 | Gale, Jr. et al. | 348/771 |
| 5,680,180 | 10/1997 | Huang | 348/656 |

OTHER PUBLICATIONS

"Micro Machines and Optical Techniques (2). Digital Mirocromirror Devices (DMD) and Their Applications to Displays", O Plus E, Oct. 1994, pp. 90–94.

"Recent Advances in Actuated Mirror Array (AMA) Projector Development", Asia Display '95, pp. 95–98.

"Mirrors on a Chip", IEEE Spectrum, Nov., 1993, pp. 27–31.

"Digital Micromirror Device Imaging Bar for Hardcopy". SPIE vol. 2413, Nelson et al, pp. 58–65.

"Micromirrors and Digital Processing", Photonics Spectra, May, 1995, pp. 118–125.

*Primary Examiner*—Frank G. Font
*Assistant Examiner*—Zandra V. Smith
*Attorney, Agent, or Firm*—Sughrue, Mion, Zinn, Macpeak & Seas, PLLC

[57] ABSTRACT

A digital micromirror device is provided with micromirrors disposed in matrix form. Each micromirror is changed between a valid reflection state and an invalid reflection state according to mirror drive data. In the valid reflection state, reflected spot light is guided to an image forming optical path and a photographic paper is exposed. In the invalid reflection state, reflected spot light is guided to an eliminating optical path. A photodetector performing a photometry of the spot light is disposed at the eliminating optical path. The micromirrors are set in the invalid reflection state one by one and the reflected spot light is measured by the photodetector so as to examine the existence of a faulty micromirror or scatter of reflectance of the micromirror. All micromirrors are set in the invalid reflection state at the same time and an output of the photodetector is inspected so as to examine whether light amount of a light source is proper or improper.

17 Claims, 6 Drawing Sheets

MICROMIRROR TYPE IMAGE FORMING APPARATUS AND ADMINISTRATION METHOD FOR THE SAME

BACKGROUND OF THE INVENTION

1. Field of the Invention

The present invention relates to a micromirror type image forming apparatus, for example, a printer or a projector in which a micromirror device is built, and an administration method for the same. More particularly, the invention relates to methods for inspecting a fault of the micromirror and for measuring luminance of light and scatter of reflectance.

2. Description of the Related Art

Recently, a mirror type spatial light modulator is suggested. The mirror type spatial light modulator has extremely small size micromirrors arranged in line or in matrix form and incident-light is deflected by controlling the tilt angle of each micromirror. The spatial light modulator has advantages of a low light attenuation coefficient and a relatively large aperture efficiency in comparison with liquid crystal or the like.

Mirror type spatial light modulators include digital micromirror devices (DMD) which tilt each micromirror by electrostatic force, piezoelectric drive type micromirror device (AMA) which tilt each micromirror by a fine piezoelectric element and the like. Such a micromirror device is provided with an image forming function so that it is supposed to be utilized in a projector or a printer. Incidentally, the principle and applications of a digital micromirror device are described in a monthly magazine "O plus E", October, 1994, pp.90–94.

For example, in a digital micromirror device, a plurality of micromirrors are arranged on a line or on an area. Each of the micromirrors keeps in a horizontal state when a power supply is off and is capable of swinging between a valid reflection state and an invalid reflection state according to one bit mirror drive data value written to a memory cell. In the valid reflection state, the micromirror tilts by +θ relative to a vertical line. In the invalid reflection state, the micromirror tilts by −θ relative to a vertical line.

In a micromirror type image forming apparatus in which the digital micromirror device is employed, the digital micromirror device is obliquely lighted by parallel rays from a light source. While the micromirror is set in the valid reflection state, spot light reflected by the micromirror is guided to an image forming optical path. A projector lens is disposed at the image forming optical path so that spot light of one line or one frame is projected on a photosensitive recording medium or a screen.

While the micromirror is set in the invalid reflection state, spot light reflected by the micromirror is guided to an eliminating optical path. The spot light is not utilized for forming an image and absorbed by a light absorption member, for example.

In order to form good-quality image stably on the photosensitive recording medium or the like by the digital micromirror device, it is necessary to administrate the operation of each micromirror. As administration items, there are, for example, detection of a faulty micromirror, measurement of reflectance of each micromirror, measurement of scatter of the reflectance and measurement of amount of light.

SUMMARY OF THE INVENTION

It is a primary object of the present invention to provide a micromirror type image forming apparatus in which the operation of each micromirror may be examined without complicating a structure of the optical system.

It is a second object of the present invention to provide an administration method of a micromirror type image forming apparatus for examining the operation of each micromirror without complicating a structure of the optical system.

It is a third object of the present invention to provide a micromirror type image forming apparatus in which a good-quality image is stably formed by performing predetermined supplementary and modification in accordance with the operation of a micromirror.

It is a fourth object of the present invention to provide an administration method of a micromirror type image forming apparatus for forming a good-quality image stably by performing predetermined supplementary data calculations and making modification in accordance with the operation of a micomirror.

In order to active the above and other objects, the micromirror type image forming apparatus according to the present invention comprises a photometry unit for measuring reflected light from a digital micromirror device on which a plurality of micromirrors are arranged. Each micromirror is changed between a valid reflection state and an invalid reflection state. When the micromirror is set in the valid reflection state, light from a light source is guided to an image forming path. When the micromirror is set in the invalid reflection state, light from the light source is guided to an eliminating optical path. The photometry unit is disposed at the eliminating optical path and measures the light reflected by the micromirror set in the invalid reflection state.

In a preferred embodiment according to the present invention, the photometry unit comprises a diffusion member and a photodetector. The diffusion member diffuses the light from the micromirror and the photodetector is disposed at the rear side of the diffusion member.

In another preferred embodiment, the photometry unit comprises an image formation optical system and an image sensor disposed at an image formation face of the image formation optical system.

The administration method of the micromirror type image forming apparatus according to the present invention comprises the steps of setting the micromirror in the invalid reflection state and performing photometry by the photometry unit.

In examining a faulty micromirror, each micromirror is set in the invalid reflection state one by one and the reflected light from the micromirror is measured by the photometry unit. The faulty micromirror is detected by a change of output signals of the photometry unit.

In adjusting luminance of the light source, all micromirrors are set in the invalid reflection state and the reflected lights from the all micromirrors are measured by the photometry unit. A photometry value obtained by the photometry unit is compared with a predetermined basic value. If the photometry value does not coincide with the basic value, the luminance of the light source is adjusted.

According to the present invention, the micromirror device may be monitored by means of the photometry unit disposed at the eliminating optical path without complicating the structure of the optical system. Further, the brightness of an image may be kept at a constant by adjusting the luminance of the light source.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
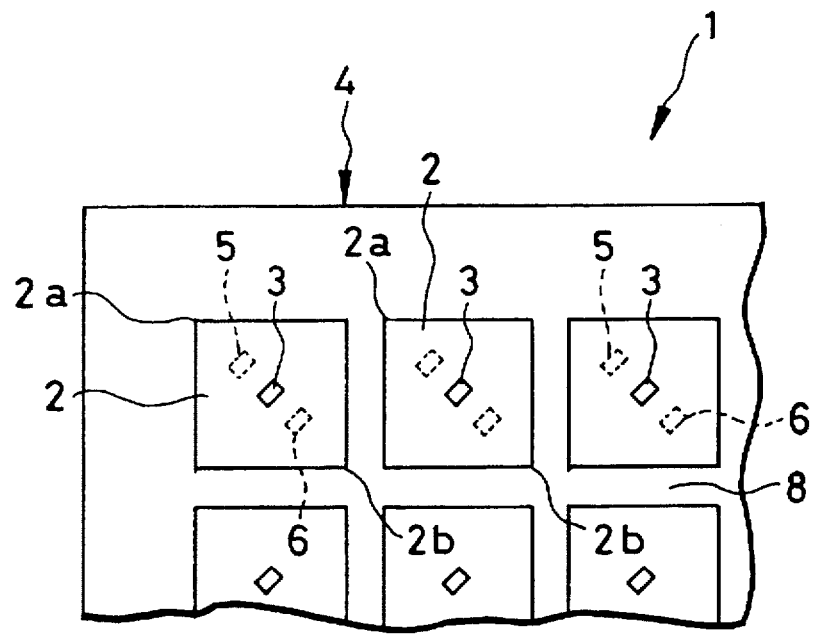
FIG. 1 is a diagram illustrating a digital micromirror device.

Referring to FIG. 1 illustrating a digital micromirror device 1, small micromirrors 2 are disposed in matrix. Each micromirror 2 is swingably supported above a static RAM (SRAM) 4 via a post 3 positioned at the central area of the micromirror 2. Each micromirror 2 is a square having a side length of, for example, 16 µm, and is made of a metal thin film such as conductive aluminum.

Address electrodes 5 and 6 are formed on both sides of the post 3. The micromirror 2 is tilted by static electricity charged between the address electrodes 5 and 6 and the micromirror 2. Specifically, the micromirror 2 is tilted such that one of corners 2a and 2b on a diagonal line passing through the post 3 and the address electrodes 5 and 6 contacts a surface of a silicon substrate 4a of SRAM 4. In practice, corners on the other diagonal line are suspended by a pair of support posts via torsion hinges. Each constituent such as micromirror 2 and post 3 is fabricated by known transistor integration techniques.

Figures 2A, 2B, 2C:
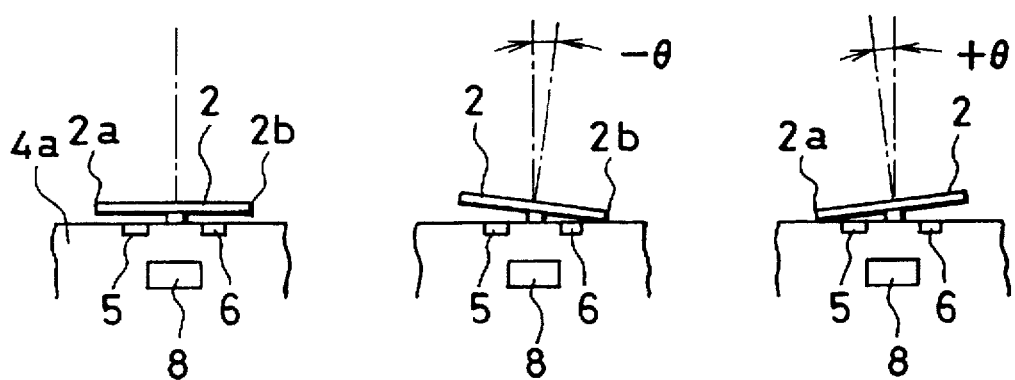
FIGS. 2A to 2C are diagrams illustrating the operation of a micromirror.

As shown in FIGS. 2A to 2C, each micromirror 2 is disposed above each memory cell 8 of SRAM 4. Each memory cell 8 is constituted of a flip-flop having two transistors and memorizes one bit data. In an active state, one transistor of the flip-flop is ON and the other is OFF. The ON-state and OFF-state are inverted by a pulse (input data).

The transistors constituting the flip-flop are connected to the address electrodes 5 and 6 respectively. Therefore, one of the address electrodes 5 and 6 is plus, and the other is minus. The state of the address electrode is determined by a mirror drive data written to the memory cell 8. Upon applying a predetermined bias voltage to the micromirror 2, the micromirror 2 tilts to one of address electrodes 5 and 6 by static electricity charged between the address electrodes 5 and 6 and the micromirror 2.

While a power supply is OFF-state, the two transistors are OFF so that the address electrodes 5 and 6 do not receive application of any voltage. Further, the micromirror 2 does not also receive application of the bias voltage. Therefore, the micromirror 2 is horizontal as shown in FIG. 2A. Even if the mirror drive data is written to the memory cell 8, the micromirror 2 is horizontal when the bias voltage is not applied to the micromirror 2.

As mirror drive data "0" is written to the memory cell 8, the address electrode 5 becomes plus and the address electrode 6 becomes minus. Upon applying plus bias voltage to the micromirror 2, repulsive force is generated between the address electrode 5 and micromirror 2 and attractive force is generated between the address electrode 6 and micromirror 2. By these static electricity, the micromirror 2 tilts until the corner 2b contacts the silicon substrate 4a as shown in FIG. 2B. At this time, a slant angle of the micromirror 2 is −θ.

As mirror drive data "1" is written to the memory cell 8, the address electrode 5 becomes minus and the address electrode 6 becomes plus. The micromirror 2 tilts by +θ as shown in FIG. 2C. Therefore, the micromirror 2 tilts by +θ or by −θ in accordance with the mirror drive data value.

The micromirror 2 has a horizontal state and two tilt states. The two tilt states are utilized when an image is formed. In one of the two tilt states, spot light travels from the micromirror 2 to form an image. For example, when the micromirror 2 takes +θ, spot light reflected by the micromirror 2 is guided to an image forming optical path and projected on a photosensitive material or a screen. When the micromirror 2 takes −θ, spot light is guided to an eliminating optical path. In this case, while the micromirror 2 takes +θ, a valid reflection state maintains in which reflection light is utilized for image formation. And while the micromirror 2 takes −θ, an invalid reflection state maintains in which reflection light is not utilized for image formation.

As one micromirror 2 forms one picture element, the tonal level of the picture element can be represented by changing the time or occurrence frequency of the valid reflection state of the micromirror 2. For example, the occurrence frequency of the valid reflection state can be changed by generating the mirror drive data "1" by number corresponding to an image data, and writing the serial mirror drive data to the memory cell 8.

Figure 3:
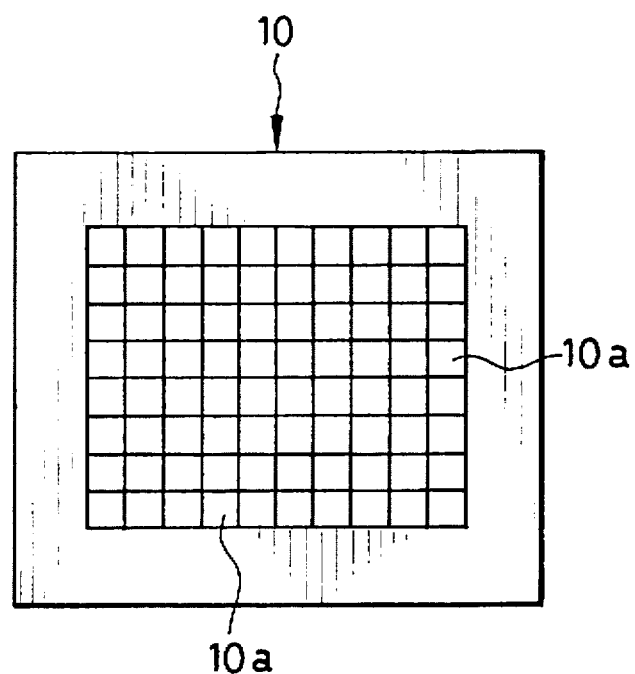
FIG. 3 is an illustrative plan view showing an example of a digital micromirror device.

FIG. 3 shows a digital micromirror device used for frame exposure. Micomirror arrays each having a number of micromirrors 10a disposed in line are juxtaposed. Accordingly, a number of micromirrors 10a are disposed in matrix. As shown in FIG. 1, a small space is formed between adjacent two micromirrors. However, for simplicity of the drawing, the micromirrors 10a in FIG. 3 are shown in contact with each other.

Figure 4:
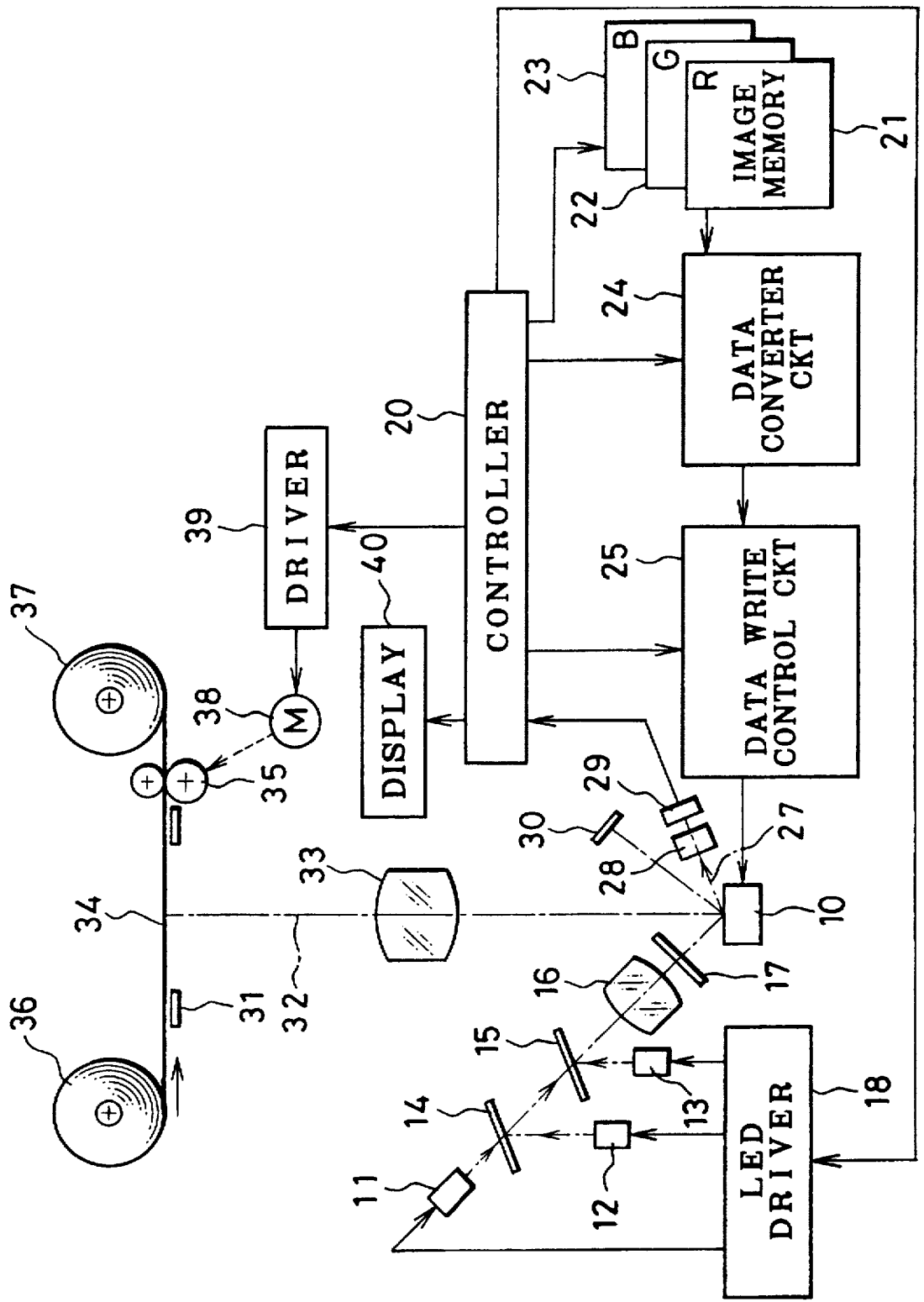
FIG. 4 is a schematic diagram of a color digital printer of this invention using a digital micromirror device.

FIG. 4 shows a digital color printer utilizing the digital micromirror device. As light sources for illuminating the digital micromirror device 10, a red LED unit 11, a green LED 12 unit and a blue LED unit 13 are employed. The red LED unit 11 radiates light in frame and has a number of red LEDs formed on a substrate in matrix. The green LED unit 12 and the blue LED unit 13 are respectively constructed similar to the red LED unit 11. Further, as the light source, a white light source radiating white light and a filter turret may be employed. The filter turret is provided with color filters of red, green and blue in sector.

Red light from the red LED unit 11 transmits through a dichroic mirror 14 reflecting green light and a dichroic mirror 15 reflecting blue light. This red light is paralleled by a lens 16 and illuminates the digital micromirror device 10. Green light from the green LED unit 12 is reflected by the dichroic mirror 14 and illuminates the digital micromirror device 10 after transmitting through the dichroic mirror 15 and the lens 16. Blue light from the blue LED unit 13 is reflected by the dichroic mirror 15 and illuminates the digital micromirror device 10. A balance filter 17 performs shading correction.

An LED driver 18 is controlled by a controller 20 to activate only the red LED unit 11 during red exposure, to activate only the green LED unit 12 during green exposure, and to activate only the blue LED unit 13 during blue exposure. Luminance of the LED unit is adjusted by changing a duty factor of a drive pulse.

Red image memory 21, green image memory 22 and blue image memory 23 store three-color image data of one frame. Image memory corresponding to exposed color is read out. For example, for red exposure, red image data is read from the red image memory 21 and sent to a data converter circuit 24 in which the red image data is converted into the mirror drive data. A data write control circuit 25 writes the mirror drive data to SRAM of the digital micromirror device 10 in synchronism with a write timing signal.

The micromirror 10a tilts by −θ in response to the mirror drive data "0" and maintains the invalid reflection state. At this time, the reflection light of the micromirror 10a is guided to an eliminating optical path 27. At this eliminating optical path 27, a diffusion box 28 and a photodetector 29 are disposed as a photometry unit. The diffusion box 28 is constituted of a cylinder of which an inner surface is finished as a reflection surface and diffusion plates fixed to both ends of the cylinder. The lights from all of the micromirrors are adapted to be entered in the photodetector 29. Incidentally, a diffusion plate may be employed instead of the diffusion box. Moreover, if the photodetector 29 is capable of receiving the lights from all of the micromirrors, the diffusion box 28 is not necessary. Further, a condenser lens may be employed instead of the diffusion box 28.

The photodetector 29 performs photometry of the spot light when the micromirror 10a maintains the invalid reflection state and sends a photometry value to the controller 20. Spot light reflected by the micromirror 10a maintaining the horizontal state is absorbed by a light absorbing plate 30.

When the mirror drive data is "1", the micromirror 10a tilts by +θ and maintains the valid reflection state. In this case, spot-like reflection light is guided to an image forming optical path 32. At this image forming optical path 32, a projector lens 33 is disposed and the spot light is projected on a photosensitive material, for example, a photographic paper 34.

The photographic paper 34 is nipped with a transport roller pair 35, intermittently pulled out of a supply roll 36 by one frame and sent to a take-up roll 37. While the photographic paper 34 is stopped, three-color images are recorded in frame sequentially. A pulse motor 38 for rotating the transport roller pair 35 is controlled by the controller 20 via a driver 39.

Next, the operation of the digital color printer as stated above will be described. Upon turning on a power supply, the controller 20 instructs the data write control circuit 25 to clear the digital micromirror device 10. The data write control circuit 25 writes the mirror drive data "0" to SRAM of the digital micromirror device 10 to tilt each micromirror 10a by −θ and cause it to maintain the invalid reflection state as shown in FIG. 2B.

Next, the controller 20 causes the LED driver 18 to activate the red LED unit 11 and illuminate the whole surface of the digital micromirror device 10. In this case, since the mirror drive data "0" is stored in each memory cell 8 of the SRAM, each micromirror 10a maintains the invalid reflection state. Thus, red spot light reflected by each micromirror 10a is guided to the eliminating optical path 27.

The controller 20 reads red image data of one frame from the red image memory 21 and sends it to the data converter circuit 24. The data converter circuit 24 converts each image data to N-bit mirror drive data. The mirror drive data includes a number of "1" according to a value of the image data. The highest bit of each mirror drive data corresponding to each picture element is picked up and sent to the data write control circuit 25. In synchronism with the first write timing signal, the mirror drive data of one frame is written to SRAM of the digital micromirror device 10.

The micromirror 10a maintains the valid reflection state while the mirror drive data "1" is supplied, and reflects the incident red light to the image forming optical path 32 as a spot light. The red spot light is projected onto the photographic paper 34 by the projector lens 33. Thus, red spot light of one frame becomes incident on the photographic paper 34 to perform the first exposure. The micromirror 10a applied with the mirror drive data "0" maintains invalid reflection state so that the reflected red spot light is guided to the eliminating optical path 27.

Next, the data converter circuit 24 picks up the second highest bit of each mirror drive data and sends it to the data write control circuit 25. The data write control circuit 25 writes the mirror drive data of one frame to the digital micromirror device 10 in synchronism with the second write timing. By this write operation, the second exposure is performed by red spot light from the micromirror 10a in the valid reflection state.

In this manner, a plurality of exposures are performed. The N-bit mirror drive data is converted such that the lowest bit of it is "0", so that all micromirrors 10a are set in the invalid reflection state lastly. Thus, each micromirror 10a performs exposure (N−1) times at a maximum in accordance with the N-bit mirror drive data for red color and records an image of N tonal levels.

After the red exposure is completed, the controller 20 causes the LED driver 18 to turn out the red LED unit 11 and to activate the green LED unit 12. Sequentially, controller 20 reads green image data of one frame from the green image memory 22 and sends it to the data converter circuit 24. The data converter circuit 24 converts the green image data of one frame to N-bit mirror drive data. The highest bit of each N-bit mirror drive data corresponding to each picture element is picked up, sent to the data write control circuit 25 and written to digital micromirror device 10 in synchronism with the first write timing signal. Each micromirror 10a changes its tilt in accordance with the corresponding mirror drive data and reflects the green spot light toward the photographic paper 34. Similar to the red exposure, the exposure of green light is performed (N−1) times so that each micromirror 10a supplies an exposure amount corresponding to the green image data to the photographic paper 34.

After the green exposure is completed, a blue image according to blue image data is printed on the photographic paper 34. With this three-color frame-sequential exposure, a full-color image is printed on the photographic paper 34. After this printing, the controller 20 rotates the pulse motor 38 via driver 39 to transport the photographic paper 34 by one frame in a direction indicated by an arrow in FIG. 4.

When positive-positive type photographic paper is used, the digital micromirror device is driven by using image data of a positive image. When general negative-positive type photographic paper is used, image data inverted into a negative image is utilized.

Next, administration for working state of the digital micromirror device will be described. The micromirror gets out of order occasionally by a shock and luminance of the light source is changed with the passage of time. Therefore, it is preferable to monitor the working state of the micromirrors before printing or every predetermined period and take proper measures. Besides operating the monitor manually by handling a key board, the monitor may be operated automatically.

Figure 5:
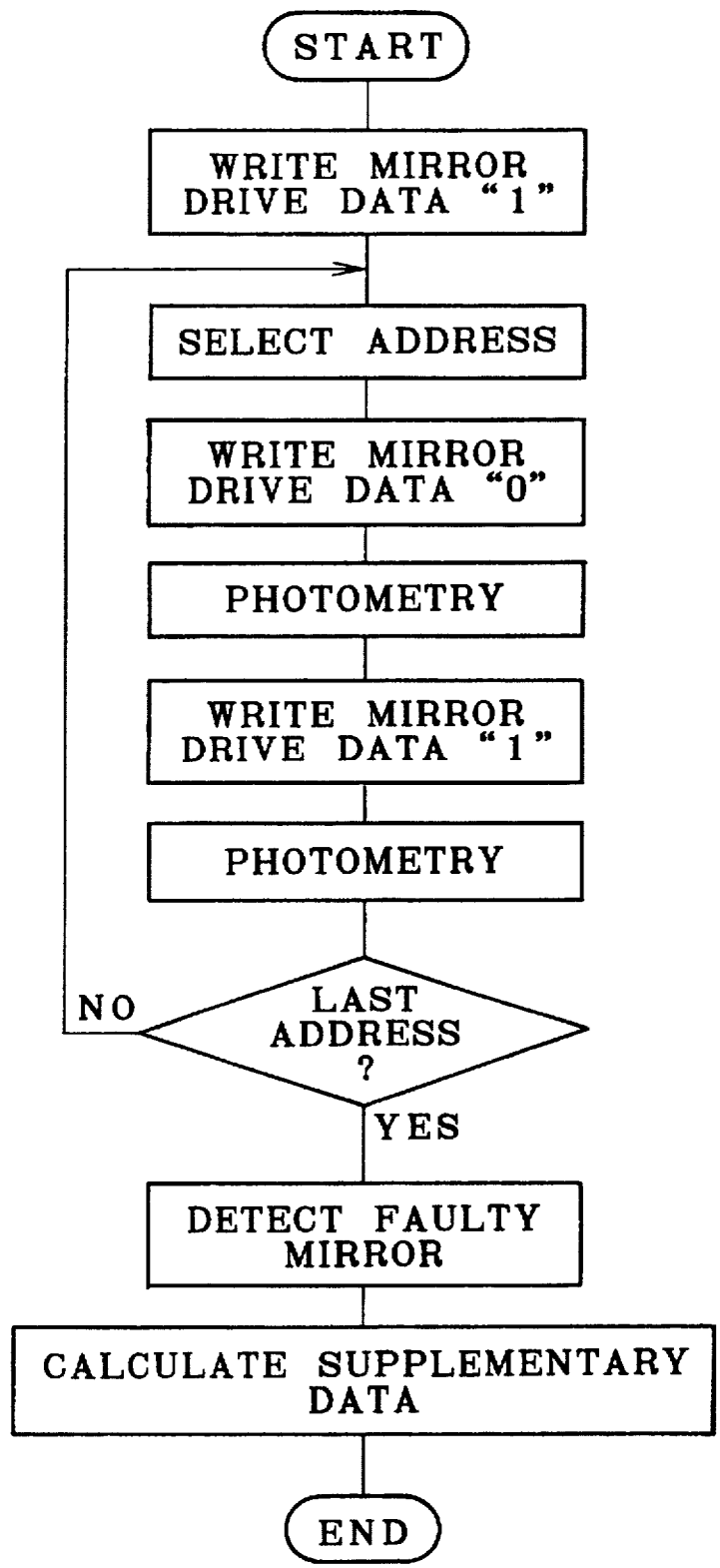
FIG. 5 is a flowchart showing a sequence of detecting a faulty mirror and measuring reflectance of each micromirror.

FIG. 5 shows a method for detecting a faulty micromirror getting out of order. After activating any LED unit, for example, the red LED unit 11, the mirror drive data "1" is written to all memory cell of the SRAM 4 so that all micromirrors 2 are set in valid reflection state. Next, an address of one micromirror is selected and the mirror drive data "0" is written to the memory cell corresponding to the address.

If the micromirror of which address is selected works normally, the micromirror is changed from valid reflection state to invalid reflection state by writing the mirror drive data. Accordingly, only spot light from the micromirror is guided to the eliminating optical path 27. The spot light becomes incident on the photodetector 29 after diffusing by the diffusion box 28. The photodetector 29 performs photometry of the spot light and the controller 20 introduces a first photometry value measured by the photodetector 29.

Next, the mirror drive data "1" is written to the memory cell corresponding to the checked micromirror so that the micromirror is set in the valid reflection state again. In this state, the controller 20 introduces a second photometry value measured by the photodetector 29. The first and second photometry values are compared. When the first photometry value is larger than the second photometry value, it is judged that the micromirror of which address is selected is normal.

Upon completing the detection of fault for the first micromirror, a second micromirror is actuated and photometry values are measured. In such a manner, all micromirrors are checked one by one.

As described above, photometry is performed in the valid reflection state and invalid reflection state and the faulty micromirror is detected by a change of output signals of the photodetector. Thus, if there is a faulty micromirror which keeps on maintaining and invalid reflection state, fault of the specified micromirror is detected correctly. An existence and a position of the fault micromirror are indicated by a display 40. Moreover, in case a faulty micromirror is adapted to be maintained in the horizontal state continuously, photometry may be performed only when a selected micromirror is set in the invalid reflection state.

When a faulty micromirror is detected, correction is carried out by shifting a picture element. Namely, after ordinary exposure, the digital micromirror device is moved by a size of one micromirror to set a normal micromirror at a position of the faulty micromirror. In this state, the normal micromirror alone is driven and a second exposure is performed. In this manner, a white point may be prevented from occurring on a hard copy. Incidentally, in case of a projector, it is not necessary to shift a picture element because the white point is not noticeable.

Figure 9:
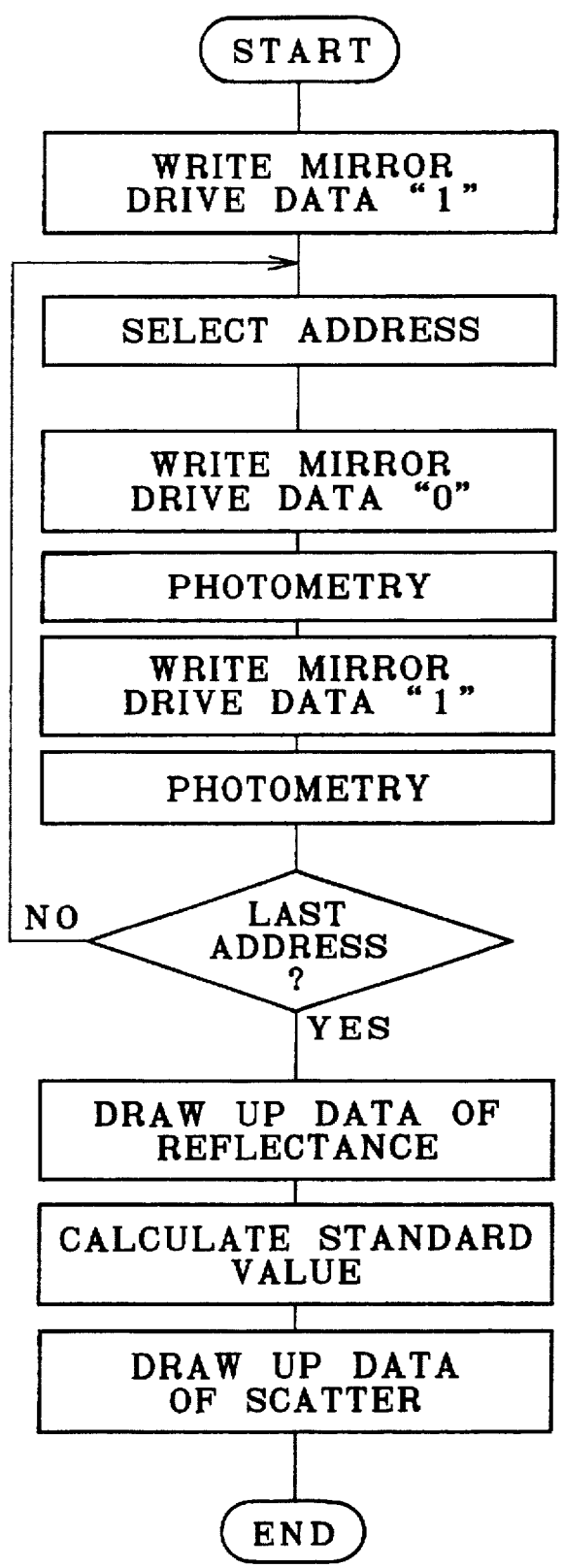
FIG. 9 is a flowchart showing a sequence of measuring scatter of reflectance.

As shown in FIG. 9, data relative to reflectance of the selected micromirror is obtained from the difference of the two measured photometry values. A minimum value or an average value of the data regarding to all micromirrors is set as a standard value. Next, scatter of reflectance is obtained by calculating a gap between the standard value and the data of each micromirror. This scatter of reflectance is set as reflectance data. The relationship between the reflectance data and a correction data is specified and stored in a table to obtain the correction data from the reflectance data by referring to the table. When a print is carried out based on an image data, the image data is corrected by adding the correction data to the image data.

Alternatively, when one picture element is recorded, it is possible to divide a record into a preliminary record and a main record. In the preliminary record, the digital micromirror device is driven based on the correction data of each micromirror. And in the main record, the digital micromirror device is driven based on the image data.

Figure 6:
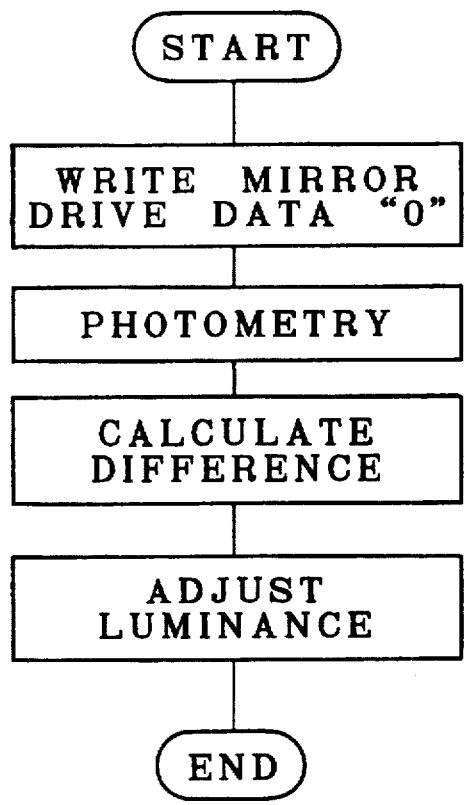
FIG. 6 is a flowchart showing a sequence of adjusting luminance of light source.

In examination of a change with the passage of time relative to light sources, a photometry of each light source is carried out. First, the red LED unit is activated. After that, as shown in FIG. 6, the mirror drive data "0" is written to all memory cells to set all micromirror in the invalid reflection state. The digital micromirror device 10 reflects spot light of one frame toward the eliminating optical path 27. The spot light of one frame is diffused by the diffusion box 28 and becomes incident on the photodetector 29.

A photometry value measured by the photodetector 29 is introduced into the controller 20. The controller 20 compares the photometry value which is obtained by actual measurement with a basic value which is equivalent to a photometry value in the optimum lighting state. If the both values do not coincide with each other, the controller 20 instructs the LED driver 18 to change a duty factor of a driving pulse. And then photometry is carried out again. This operation is repeated until both values coincide with each other and the duty factor of the driving pulse of the red LED unit 11 is determined.

Next, the green LED unit 12 is activated. A duty factor of the driving pulse is determined by performing a similar operation to that of the red LED unit 11. Finally, A duty factor of the driving pulse of the blue LED unit 13 is determined. In printing, each LED unit is driven by the driving pulse having a duty factor which is determined as described above so that expected light amount is obtained. By the way, besides adjusting the duty factor of the driving pulse, an ND filter may be employed. The ND filter has an appropriate density and is removably disposed at the front or rear of the lens 16.

Figure 7:
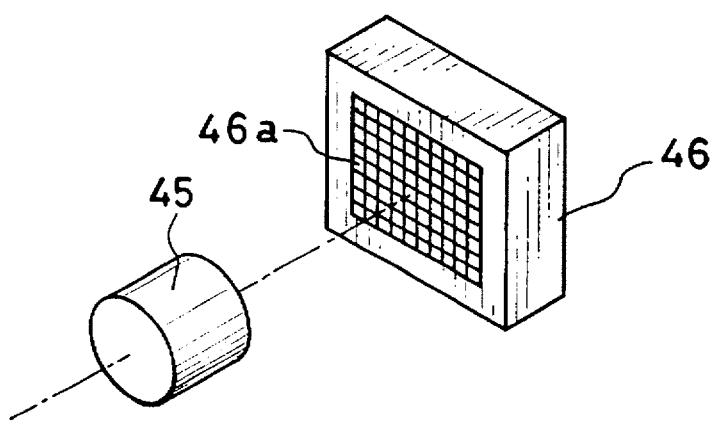
FIG. 7 is a perspective view illustrating a photometry unit using an image area sensor.

As shown in FIG. 7, an image formation lens 45 and an image area sensor 46 may be employed as a photometry unit. Pixels 46a which transfer incident-light to electricity are formed in matrix on the image area sensor 46. Each pixel 46a corresponds to each micromirror one by one. Therefore, in detecting a faulty micromirror or measuring reflectance, all micromirrors may be driven at the same time and photometry of each micromirror may be carried out at the same time.

When the pixel 46a of the image area sensor 46 is larger than the micromirror, for example, one pixel corresponds to four micromirrors, the micromirror is driven one by one in a group which is made up with the four micromirrors. When the pixel 46a is smaller than the micromirror, a plurality of pixels make up a group and an average of photometry values measured by the pixels of the group is used.

Figure 8:
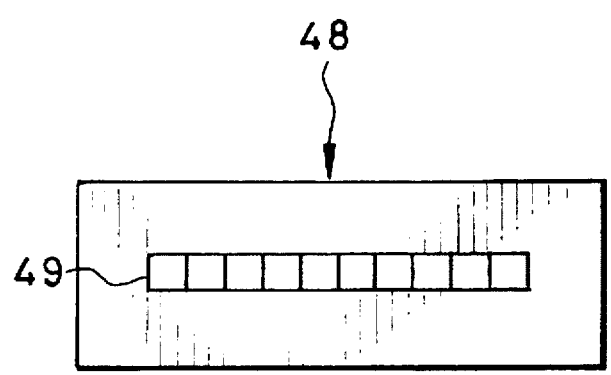
FIG. 8 is an illustrative view showing a digital micromirror device using a micromirror array of one line.

In a line printer recording an image line by line, a digital micromirror device 48, as shown in FIG. 8, may be utilized. The digital micromirror device 48 is provided with micromirrors 49 disposed in line. Further, in case an image sensor is employed as a photometry unit, an image line sensor is utilized. The image line sensor is provided with a plurality of pixels disposed in line.

In printing, if a faint light reflected by a surface of the diffusion box 28 returns to the digital micromirror device 10, there is a possibility to generate a flare. In order to prevent the flare from generating, it is preferable to change the photometry unit constituted of the diffusion box 28 and the photodetector 29 to a light absorbing member. In this case, the photometry unit and the light absorbing member are attached to a moving mount. The photometry unit is set at the eliminating optical path when the digital micromirror device is monitored and the light absorbing member is set at the optical path in printing instead of the photometry unit.

Moreover, it is preferable to provide a shutter at the image forming optical path in order to not expose a photographic paper to light while the digital micromirror device is monitored. The photographic paper may be shielded except in printing.

Further, besides a printer, the present invention is applied to an optical apparatus, for example, a projector, an image displaying device, a lighting device and so forth. The present invention is also applied to an optical apparatus in which a piezoelectric drive type micromirror device is built.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A micromirror type image forming apparatus including a micromirror device having at least one micromirror array in which a plurality of micromirrors are disposed and a light source for illuminating said micromirror device, each of said micromirrors is changeable between a valid reflection state and an invalid reflection state, in said valid reflection state, light from said light source being reflected toward an image forming optical path and in said invalid reflection state, said light being reflected toward an eliminating optical path, said micromirror type image forming apparatus comprising:

a photometry unit for measuring photometric values of said light reflected by said micromirror in said invalid reflection state, said photometry unit being disposed at said eliminating optical path.

2. A micromirror type image forming apparatus according to claim 1, wherein said photometry unit comprises a diffusion member and a photodetector, said diffusion member diffusing said light from said micromirror and said photodetector being disposed at rear side of said diffusion member.

3. A micromirror type image forming apparatus according to claim 1, wherein said photometry unit comprises an image formation optical system and an image sensor having a plurality of pixels which transfer incident-light to electricity, said image sensor being constituted of at least one line pixels and disposed at an image formation face of said image formation optical system.

4. A micromirror type image forming apparatus according to claim 3, wherein said micromirrors and said pixels are disposed in a matrix respectively.

5. A micromirror type image forming apparatus according to claim 3, wherein said micromirrors and said pixels are disposed in a line respectively.

6. A micromirror type image forming apparatus according to claim 4 or 5, wherein a number of said micromirrors is same with that of said pixels so as to correspond to each other one by one.

7. A micromirror type image forming apparatus according to claim 1, said micromirror device is illuminated by said light from said light source via a lens and a balance filter, said lens paralleling said light and said balance filter performing shading correction.

8. A micromirror type image forming apparatus according to claim 1, further comprising a controller disposed at the eliminating optical path, the controller being operative to determine a micromirror fault by comparing photometric values measured by the photometry unit, and upon detection of the micromirror fault, to move the micromirror device to correct the micromirror fault.

9. An administration method for a micromirror type image forming apparatus including a micromirror device in which a plurality of micromirrors are disposed, and a light source for illuminating said micromirror device, each of said micromirrors is changeable between a valid reflection state and an invalid reflection state, in said valid reflection state, light from said light source being reflected toward an image forming optical path and in said invalid reflection state, said light being reflected toward an eliminating optical path, said administration method comprising the steps of:

setting all of said micromirrors in said invalid reflection state;

performing photometry of light reflected by all of said micromirrors with a photometry unit disposed at said eliminating optical path; and adjusting luminance of light illuminating said micromirror device such that a photometry value obtained by said photometry unit corresponds to a basic value.

10. An administration method for a micromirror type image forming apparatus including a micromirror device in which a plurality of micromirrors are disposed and a light source for illuminating said micromirror device, each of said micromirrors is changeable between a valid reflection state and an invalid reflection state, in said valid reflection state, light from said light source being reflected toward an image forming optical path and in a said invalid reflection state, said light being reflected toward an eliminating optical path, said administration method comprising the steps of:

changing each of said micromirrors between said valid reflection state and said invalid reflection state;

performing photometry of reflected light from each of said micromirrors individually with a photometry unit disposed at said eliminating optical path; and detecting a faulty micromirror in an abnormal reflection state by an output signal of said photometry unit.

11. An administration method for a micromirror type image forming apparatus according to claim 10, wherein said micromirror is changed one by one in order and said reflected light of said micromirror is measured with said photometry unit.

12. An administration method for a micromirror type image forming apparatus according to claim 10, wherein said photometry unit has a plurality of pixels disposed in a manner that each of said pixels corresponds to each of said micromirrors and said micromirrors are changed at the same time.

13. An administration method for a micromirror type image forming apparatus according to claim 10, further comprising the step of:

displaying a position of said faulty micromirror on a display.

14. An administration method for a micromirror type image forming apparatus including a micromirror device in which a plurality of micromirrors are disposed and a light source for illuminating said micromirror device, each of said micromirrors is changeable between a valid reflection state and an invalid reflection state, in said valid reflection state, light from said light source being reflected toward an image forming optical path and in said invalid reflection state, said light being reflected toward an eliminating optical path, said administration method comprising the steps of:

setting all of said micromirrors in one state of said valid reflection state and said invalid reflection state;

obtaining a first photometry value by measuring reflected light from said micromirrors in said one state with a photometry unit disposed at said eliminating optical path;

setting one of said micromirrors in the other state of said valid reflection state and said invalid reflection state;

obtaining a second photometry value by measuring reflected light from said micromirrors in which one of said micromirrors is set in said other state with said photometry unit; and comparing said first photometry value with said second photometry value in order to judge said micromirror as faulty when said both photometry values coincide with each other.

15. An administration method for a micromirror type image forming apparatus including a micromirror device in which a plurality of micromirrors are disposed and a light source for illuminating said micromirror device, each of said micromirrors is changeable between a valid reflection state and an invalid reflection state, in said valid reflection state, light from said light source being reflected toward an image forming optical path and in said invalid reflection state, said light being reflected toward an eliminating optical path, said administration method comprising the steps of:

setting each of said micromirrors in said invalid reflection state;

performing photometry of reflected light from each of said micromirrors with a photometry unit disposed at said eliminating optical path; and obtaining scatter relative to reflectance of each of said micromirrors.

16. An administration method for a micromirror type image forming apparatus including a micromirror device in which a plurality of micromirrors are disposed and a light source for illuminating said micromirror device, each of said micromirrors is changeable between a valid reflection state and an invalid reflection state, in said valid reflection state, light from said light source being reflected toward an image forming optical path and in said invalid reflection state, said light being reflected toward an eliminating optical path, said administration method comprising the steps of:

setting all of said micromirrors in one state of said valid reflection state and said invalid reflection state;

obtaining a first photometry value by measuring reflected light from said micromirrors in said one state with a photometry unit disposed at said eliminating optical path;

setting one of said micromirrors in the other state of said valid reflection state and said invalid reflection state;

obtaining a second photometry value by measuring reflected light from said micromirrors in which one of said micromirrors is set in said other state with said photometry unit;

obtaining a difference between said first photometry value and said second photometry value;

determining an average value of said differences obtained regarding to all of said micromirrors;

obtaining scatter relative to reflectance of each of said micromirrors in accordance with gaps between said differences and said average value.

17. A micromirror type image forming apparatus including a micromirror device having at least one micromirror array in which a plurality of micromirrors are disposed and a light source for illuminating said micromirror device, each of said micromirrors is changeable between a valid reflection state and an invalid reflection state, in said valid reflection state, light from said light source being reflected toward an image forming optical path and in said invalid reflection state, said light being reflected toward an eliminating optical path, said micromirror type image forming apparatus comprising:

a photometry unit for performing photometry of said light reflected by said micromirror in said invalid reflection state, said photometry unit being disposed at said eliminating optical path;

said micromirror device being illuminated by said light from said light source via a lens and a balance filter, said lens paralleling said light and said balance filter performing shading correction.

\* \* \* \* \*